(12) United States Patent  (10) Patent No.: US 8,540,569 B2
Orlinsky et al.  (45) Date of Patent: Sep. 24, 2013

(54) METHOD AND SYSTEM FOR MULTIPLAYER MULTIFUNCTIONAL ELECTRONIC SURFACE GAMING APPARATUS

(76) Inventors: Eric Gustav Orlinsky, Baltimore, MD (US); Charles A. Morris, Cockeysville, MD (US)

( * ) Notice: Subject to any disclaimer, the term of this patent is extended or adjusted under 35 U.S.C. 154(b) by 635 days.

(21) Appl. No.: 12/554,288

(22) Filed: Sep. 4, 2009

(65) Prior Publication Data
US 2010/0062846 A1 Mar. 11, 2010

Related U.S. Application Data

(60) Provisional application No. 61/094,601, filed on Sep. 5, 2008.

(51) Int. Cl.
*A63F 13/00* (2006.01)
*A63F 9/24* (2006.01)

(52) U.S. Cl.
USPC ................ 463/30; 463/37; 463/42; 273/236; 273/287

(58) Field of Classification Search
USPC ................ 463/1, 9, 30, 34, 37, 42; 345/156, 345/158, 173, 174; 273/237, 239, 248, 258, 273/285
See application file for complete search history.

(56) References Cited

U.S. PATENT DOCUMENTS

| | | |
|---|---|---|
| 1,674,533 A | 6/1928 | Templeton |
| 3,645,529 A | 2/1972 | Andrews |
| 3,654,392 A | 4/1972 | Beinhocker et al. |
| D254,626 S | 4/1980 | Bialek |
| 4,300,770 A | 11/1981 | Knetzger |
| 4,341,385 A | 7/1982 | Doyle et al. |
| 4,348,191 A | 9/1982 | Lipsitz et al. |
| 4,369,975 A | 1/1983 | Tarc |
| D272,919 S | 3/1984 | Chambers et al. |
| 4,455,025 A | 6/1984 | Itkis |
| 4,624,462 A | 11/1986 | Itkis |
| 4,747,600 A | 5/1988 | Richardson |

(Continued)

FOREIGN PATENT DOCUMENTS

| | | |
|---|---|---|
| EP | 0867209 | 9/1998 |
| GB | 2051589 | 1/1981 |

(Continued)

OTHER PUBLICATIONS

"Philips Entertaible—Electronic Multi-Touch Tabletop Gaming Platform" article, written by Mike Hanlon, available on or before Sep. 3, 2006, retrieved from URL <http://www.gizmag.com/go/6093/>, 4 pages.*

(Continued)

*Primary Examiner* — William Brewster
*Assistant Examiner* — Jason Skaarup
(74) *Attorney, Agent, or Firm* — Saul Ewing LLP

(57) ABSTRACT

A method for electronic board game play by producing on a display surface a first image which is a field of play image that senses at least one object on the display surface. The object is proximate or in contact with the display surface thus forming on a table-top horizontal display surface, at least one game piece image overlaid on the field of play image, and determined by sensing a position of the object on the display surface.

34 Claims, 7 Drawing Sheets

(56) References Cited

U.S. PATENT DOCUMENTS

| | | | |
|---|---|---|---|
| 4,848,771 | A | 7/1989 | Richardson |
| 5,007,649 | A | 4/1991 | Richardson |
| 5,043,887 | A | 8/1991 | Richardson |
| 5,072,381 | A | 12/1991 | Richardson et al. |
| D337,791 | S | 7/1993 | Obtumah |
| 5,588,913 | A | 12/1996 | Hecht |
| 5,624,119 | A | 4/1997 | Leake |
| 5,702,305 | A | 12/1997 | Norman et al. |
| 5,759,102 | A | 6/1998 | Pease et al. |
| 5,772,208 | A | 6/1998 | McTaggart |
| 5,853,327 | A | 12/1998 | Gilboa |
| 5,857,911 | A | 1/1999 | Fioretti |
| 5,963,371 | A * | 10/1999 | Needham et al. ............ 359/464 |
| 6,120,026 | A * | 9/2000 | Whitney et al. ............. 273/236 |
| 6,213,467 | B1 | 4/2001 | Andrews |
| 6,237,159 | B1 | 5/2001 | Martin |
| 6,251,014 | B1 | 6/2001 | Stockdale et al. |
| 6,298,495 | B1 | 10/2001 | Totani |
| 6,354,941 | B2 | 3/2002 | Miller et al. |
| 6,394,900 | B1 | 5/2002 | McGlone et al. |
| 6,443,839 | B2 | 9/2002 | Stockdale et al. |
| 6,503,147 | B1 | 1/2003 | Stockdale et al. |
| 6,504,649 | B1 | 1/2003 | Myers |
| 6,536,766 | B1 | 3/2003 | Deitch et al. |
| 6,712,359 | B1 | 3/2004 | Vanlier |
| 6,765,550 | B2 | 7/2004 | Janick et al. |
| 6,899,627 | B2 | 5/2005 | Lam et al. |
| 6,935,946 | B2 | 8/2005 | Yoseloff et al. |
| 6,981,635 | B1 | 1/2006 | Hughs-Baird et al. |
| 6,991,232 | B1 | 1/2006 | Yufa |
| 6,997,808 | B2 | 2/2006 | Rodgers et al. |
| 7,004,836 | B2 | 2/2006 | Kaminkow et al. |
| 7,008,316 | B1 | 3/2006 | Pugh |
| 2002/0052231 | A1 | 5/2002 | Fioretti |
| 2002/0090985 | A1 | 7/2002 | Tochner et al. |
| 2003/0003986 | A1 | 1/2003 | Wei et al. |
| 2004/0189612 | A1* | 9/2004 | Bottari et al. ............... 345/173 |
| 2004/0248650 | A1* | 12/2004 | Colbert et al. ................. 463/37 |
| 2005/0162410 | A1 | 7/2005 | Johnson et al. |
| 2005/0215312 | A1 | 9/2005 | Tresser et al. |
| 2005/0248091 | A1 | 11/2005 | Neervoort et al. |
| 2006/0073891 | A1* | 4/2006 | Holt ............................... 463/30 |
| 2006/0089193 | A1 | 4/2006 | Buecheler et al. |
| 2006/0175753 | A1 | 8/2006 | MacIver et al. |
| 2007/0021173 | A1 | 1/2007 | Seelig et al. |
| 2007/0222762 | A1 | 9/2007 | Van Delden et al. |
| 2007/0222915 | A1 | 9/2007 | Niioka et al. |
| 2008/0004108 | A1 | 1/2008 | Klinkhammer |
| 2008/0004110 | A1 | 1/2008 | Cortenraad et al. |
| 2008/0058045 | A1 | 3/2008 | Cortenraad et al. |
| 2008/0102948 | A1 | 5/2008 | Kogo |
| 2008/0174546 | A1* | 7/2008 | Schneider .................... 345/156 |
| 2008/0280682 | A1* | 11/2008 | Brunner et al. ................. 463/40 |
| 2009/0135162 | A1* | 5/2009 | Van De Wijdeven et al. 345/175 |
| 2009/0322672 | A1* | 12/2009 | Buil ............................. 345/156 |
| 2009/0322678 | A1* | 12/2009 | Lashina et al. ................ 345/158 |
| 2010/0004062 | A1* | 1/2010 | Maharbiz et al. .............. 463/36 |
| 2010/0007601 | A1* | 1/2010 | Lashina et al. ................ 345/156 |
| 2010/0045530 | A1* | 2/2010 | Van De Wijdeven ......... 342/463 |
| 2010/0060896 | A1* | 3/2010 | Van De Wijdeven et al. 356/448 |
| 2010/0066016 | A1* | 3/2010 | Van De Wijdeven et al. 273/237 |
| 2010/0182168 | A1* | 7/2010 | Van De Wijdeven et al. .. 341/20 |

FOREIGN PATENT DOCUMENTS

| | | | |
|---|---|---|---|
| GB | 2103943 | | 3/1983 |
| GB | 2235325 | A * | 2/1991 |
| GB | 2345251 | | 7/2000 |
| WO | 9633782 | | 10/1996 |
| WO | 9900165 | | 1/1999 |
| WO | 2345250 | | 7/2000 |
| WO | 2006013580 | | 2/2006 |
| WO | 2006058204 | | 6/2006 |
| WO | 2006081387 | | 8/2006 |

OTHER PUBLICATIONS

"Password," Philips Research Technology Magazine; Issue 26, pp. 24-27 (Feb. 2006).

Internet printout of Dec. 18, 2007 from www.adesso.com; Adesso Debuts New CyberPad Digital; New Product Release.

Internet printout of Dec. 18, 2007 from http://accessories.us.dell.com; Adesso AKB-210 Mini Flexible Keyboard.

Internet printout of Dec. 18, 2007 from http://www.nextag.com; Generic Air Soft Flexible 85-KEY USB/PS/2 Silicone Keyboard.

Internet printout of Dec. 2, 2008 from http://www.ergoindemand.com; Monitor Privacy Filter—Notebook Privacy Screen.

Internet printout of Dec. 2, 2008 from http://plexsuply.net; Kantek Secure View Notebook LCD Privacy Filter.

3M Optical Systems Division Flyer; Get Screen Smart; 3M Mobile Privacy Film; 2008.

Internet printout of May 9, 2008 from http://www.gizmag.com; Philips Entertable—Electronic Multi-Touch Tabletop Gaming Platform.

Internet printout of May 8, 2008 from http://www.crunchgear.com; Patent Monkey article; "Microsoft Surface Not Just a Touch Screen".

Internet printout of May 9, 2008 from http://www.research.philips.com; Philips Research; "Entertaible concept: combination of electronic gaming and traditional board games".

* cited by examiner

"Checkers"® Example

"Battleship"® Example

"Scrabble"® Example

METHOD AND SYSTEM FOR MULTIPLAYER MULTIFUNCTIONAL ELECTRONIC SURFACE GAMING APPARATUS

FIELD

The field of the invention relates to a device, a system and a method for a multiplayer game board surface, and more particularly to a multi-player multifunctional touch-sensitive surface gaming apparatus as an electronic game board for playing various board games.

BACKGROUND

Traditional board games, or table games, are games played with counters or pieces that are placed on, removed from or moved across a board. The board is a pre-marked surface specific to the game being played. Simple board games are often ideal entertainment wherein interaction between the players is valued (e.g. family entertainment). Board games became widely popular in the 20$^{th}$ century. Given the wide popularity with consumers of all ages, many different types of board games have been developed over the years. Popular board games include, but are not limited to: MONOPOLY®, CLUE®, RISK®, LIFE®, SCRABBLE®, TRIVIAL PURSUIT®, chess, checkers, etc. These exemplified board games have been available for generations as a testimonial to their lasting popularity.

Video games were introduced as a home entertainment medium in the 1970's with systems such as ATARI® and COMMODORE®. Over the past two decades the video and computer game industry has experienced sustained growth to become a $10 billion dollar industry. Many board games are now available as computer games, including the option to have the computer act as an opponent. The rise of computers has led to a relative decline in the most complicated board games, as computers require less space, and the games don't have to be set up and cleared away. With the Internet, many board games can now be played online against a computer or other players. Some web sites allow play in real time and immediately show the opponent's moves, while others use e-mail to notify the players after each move. Some board games make use of additional components, aside from the board and playing pieces. Some games use video cassettes, CDs and DVDs to provide an accompaniment to the game. A genre of DVD games makes use of the interactive features of DVDs, such as a "quizmaster" for trivia games.

There have been attempts to construct a game board which offers advantages of both traditional board games and computer or video games. Such combined systems can be capable of detecting the presence of playing pieces at different locations on the game board and may be capable of identifying the pieces.

The following patents describe position sensing boards, some of which are capable of differentiating between different playing pieces on a game board system, including U.S. Pat. No. 5,088,928, U.S. Pat. No. 4,341,385, U.S. Pat. No. 5,853,327, US Pub. No. 200/0248091 A1, US Pub. No. 2008/00041110 A1, the disclosure of each is incorporated herein in their entirety.

There is therefore a continuing unmet need to provide for a flexible electronic board game apparatus for universal multi-player table-top or surface board game play to eliminate the need for a household to have a collection of multiple traditional board games taking up space and risking loss of game pieces.

SUMMARY

Provided herein is a hybrid gaming system that combines the desirable strategic elements of "traditional" board games with the interactive capabilities of video games. It is an aspect of the invention to provide for a method and system to allow for playing a board game comprising: producing on a display surface a first image, wherein the first image is a game board image; sensing at least one object on the display surface, wherein the object is in contact with the display surface; forming on the display surface at least one game piece image at a first position overlaid on the game board image, wherein the forming is determined by sensing the object in contact with the display surface; moving the game piece image from the first position on the game board image to a second position on the game board image by contacting the object at the first position and subsequently at the second position. The object, also referred to herein as a pointing device, in contact with the display surface can be a player's digit (i.e. finger) or a game piece or other object in contact with the surface. Therefore, there is no need for game pieces or other pointing tools to play any game on the game board of the invention.

It is an aspect of the invention described herein to provide for a game board system comprising: a game board surface adapted to display a game board image; a touch sensitive game board surface adapted to receive user input from a pointing device in contact with the game board surface, wherein the touch sensitive game board surface senses the movement of a pointing device from a first position to a second position and the driver visually translates (or displays) the movement as moving a game piece image across the game board surface; a software driver wherein the software driver translates the user input into movement of a game piece image from a first position to a second position; moving the game piece image from a first position on the game board image to a second position and subsequent positions on the game board image by contacting the object at the first position and subsequently at the second position, wherein the touch sensitive game board surface is adapted to receive input from multiple player identities, and wherein the game system comprises no physical game pieces.

There is, thus provided, in accordance with a preferred embodiment of the present invention, a multi-user, multifunctional game board which comprises a touch sensitive game board surface which can sense the location of game piece images based on the position of a pointing device, (i.e. a player's finger). The orientation of the game piece images may include one or more of the following, without the need for a physical game piece: position, movement, direction and direction of movement based on the motions of a user's finger on the surface of the game board. In accordance with a preferred embodiment of the invention, the game board surface is operative to differentiate between different types of movement and different game piece images.

The system described herein solves the continuing unmet need to provide for a flexible electronic board game apparatus for universal multiplayer table-top (i.e. surface) board game play. It further provides for a gaming system that provides for player-to-player interaction rather than player-to-screen interactions.

It is also a benefit of the method and system disclosed herein to eliminate the need for a collection of multiple traditional board games that can take up space and where lost pieces or tokens can make the game useless.

DETAILED DESCRIPTION OF PREFERRED EMBODIMENTS

Figure 1:
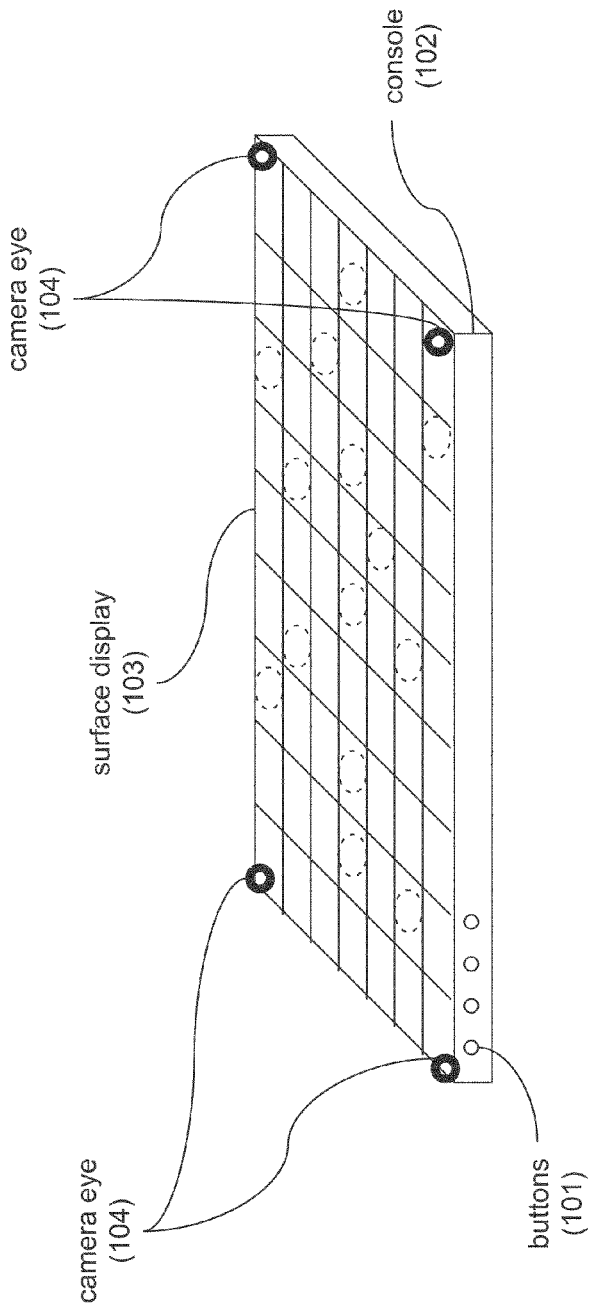
FIG. 1 illustrates a schematic of the game board showing an examplary, but in no way limiting, game board device for playing checkers.
Figure 2:
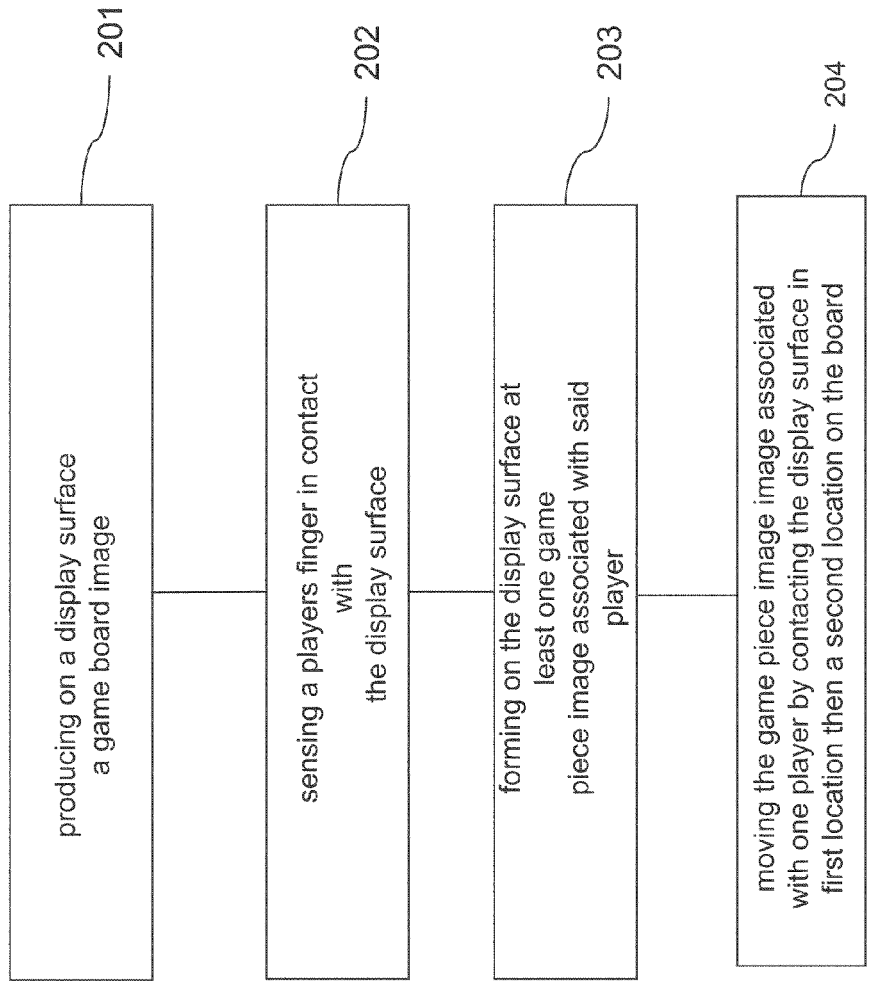
FIG. 2 illustrates a flow diagram of the method for playing a game on the board game device.
Figure 3:
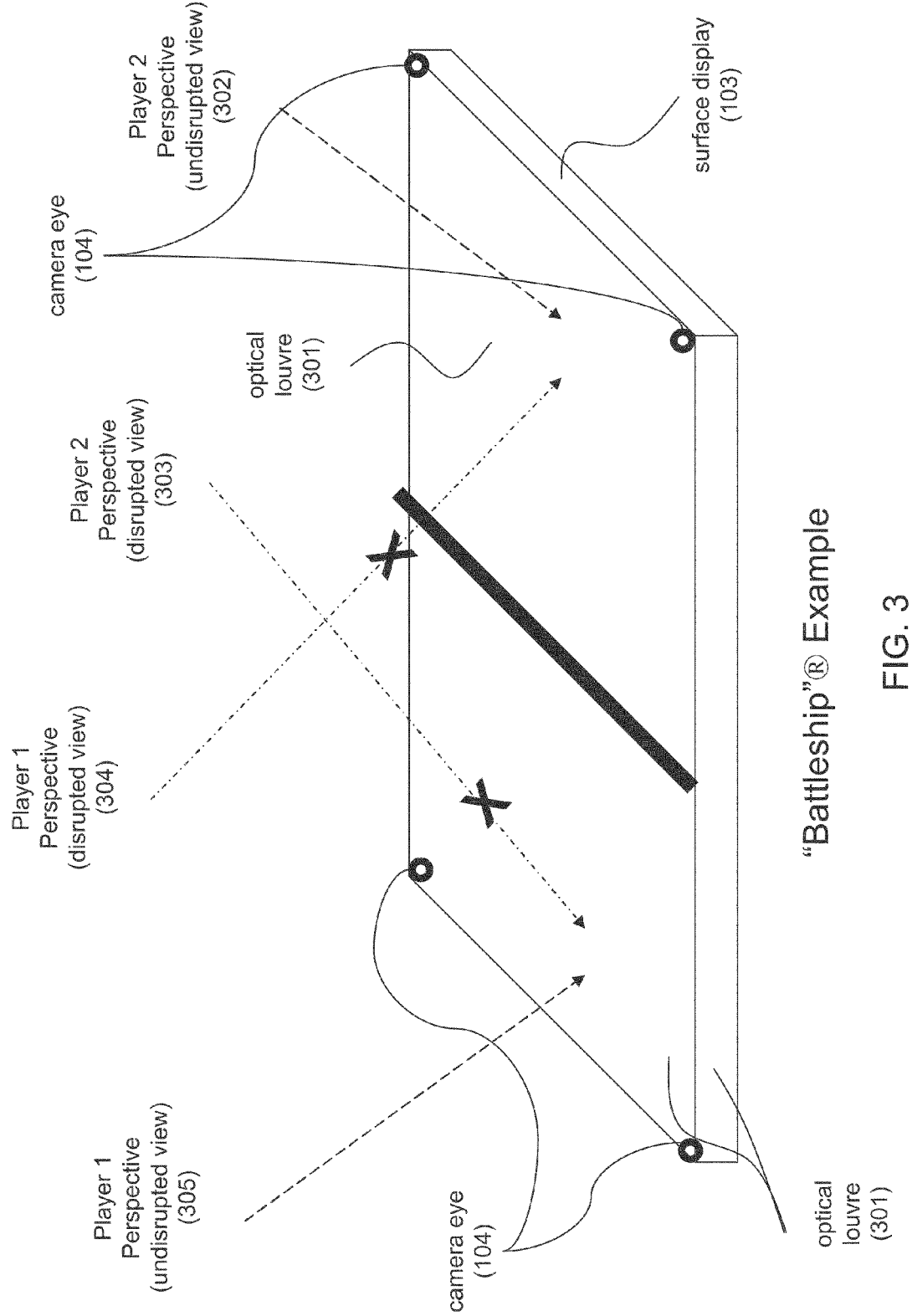
FIG. 3 illustrates a schematic of the electronic optical louvre system showing angled louvres where one player has an undisrupted view of the surface display, while the opposing players show the use of the optical louvre system of the invention for playing the game of "BATTLESHIP®," by way of example only, not limitation.
Figure 4:
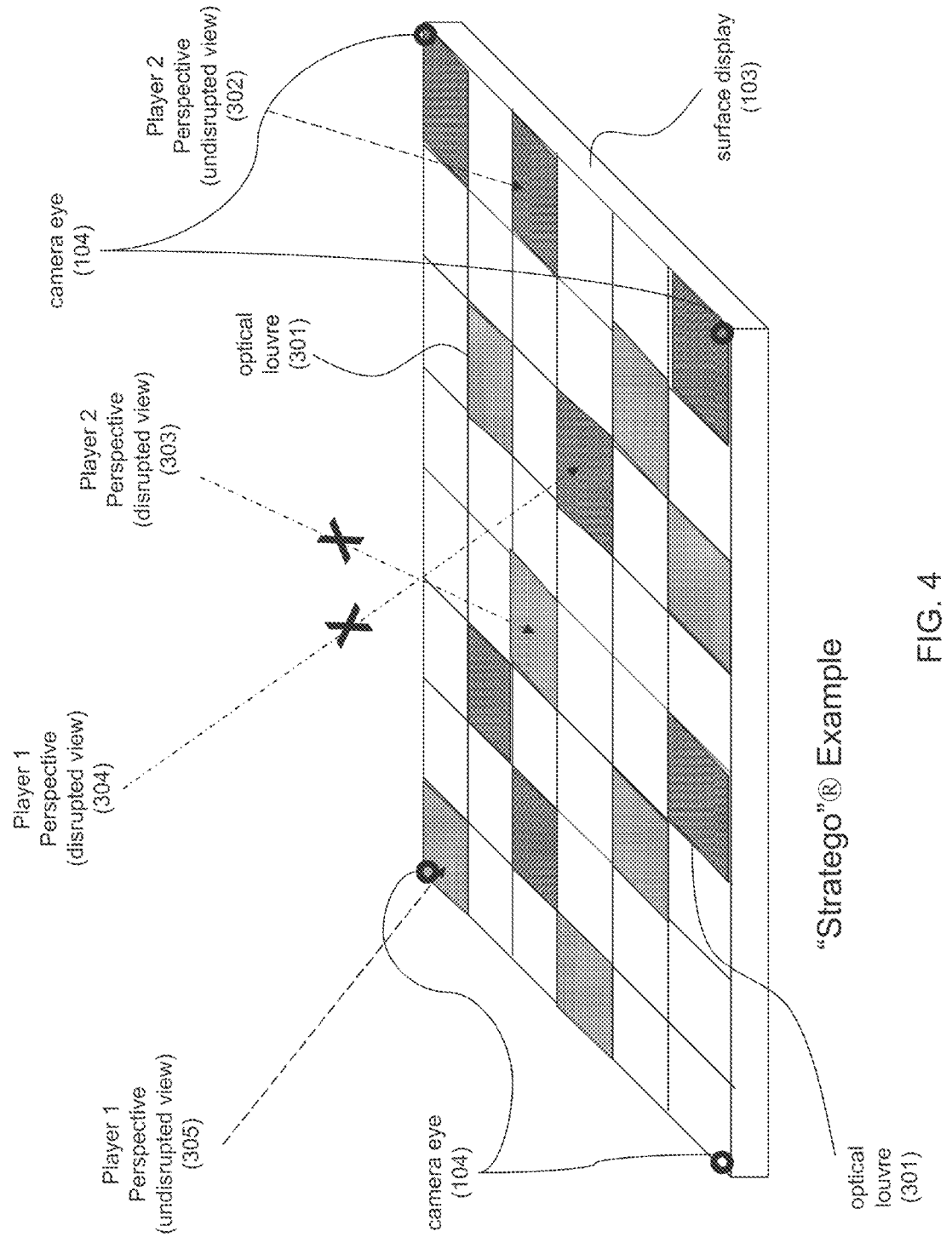
FIG. 4 illustrates a schematic of the electrical optical louvre as in FIG. 3, but for playing the game of "STRATEGO®," by way of example only, not limitation.
Figure 5:
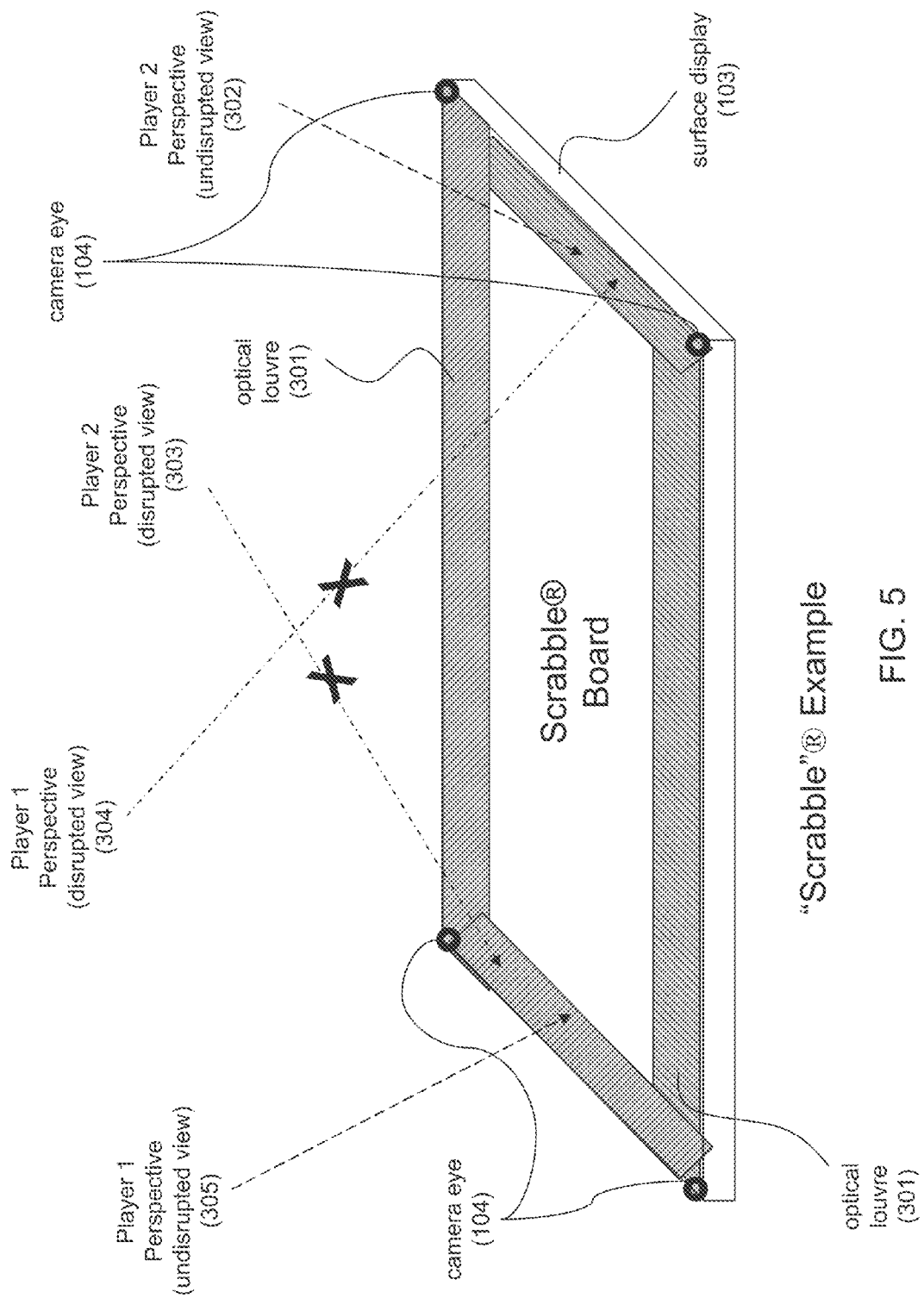
FIG. 5 illustrates a schematic of electrical optical louvres as in FIGS. 3 and 4, but for playing the game of "SCRABBLE®," by way of example, not limitation.
Figure 6:
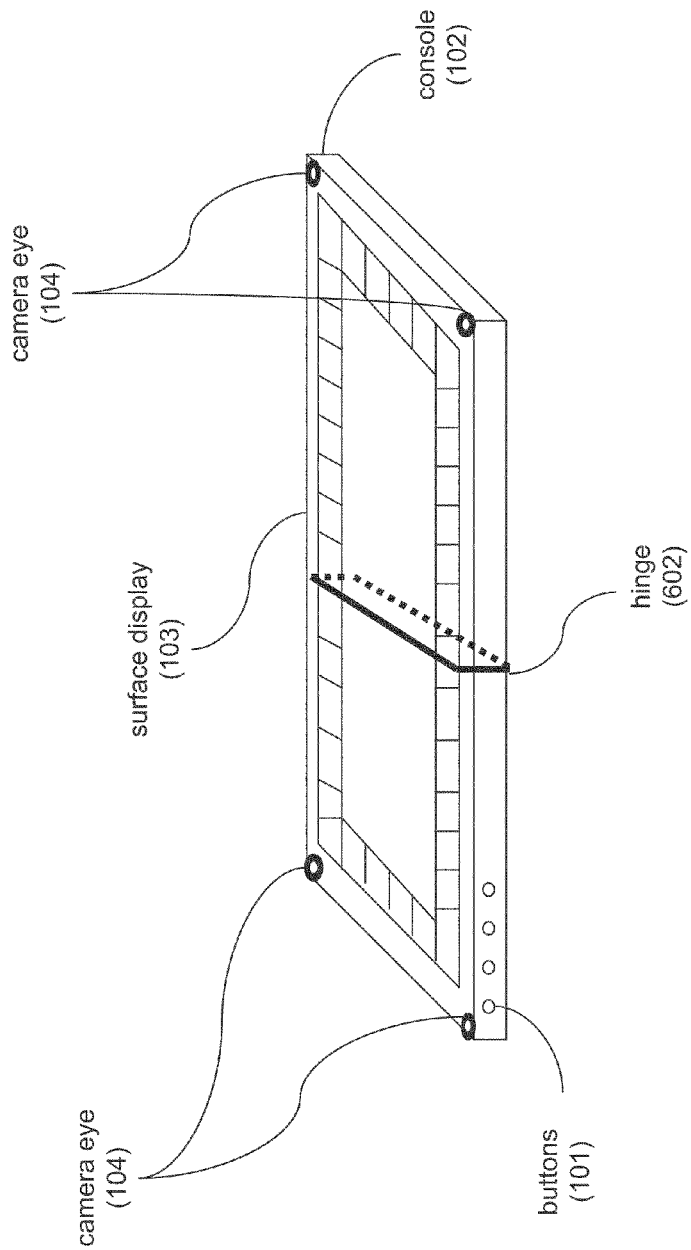
FIG. 6 illustrates a schematic of collapsible features of the invention, whereby the console comprises a hinge to fold the board and optionally comprises folding/collapsible and height-adjustable legs for comfort of play on floors or irregular surfaces.
Figure 7:
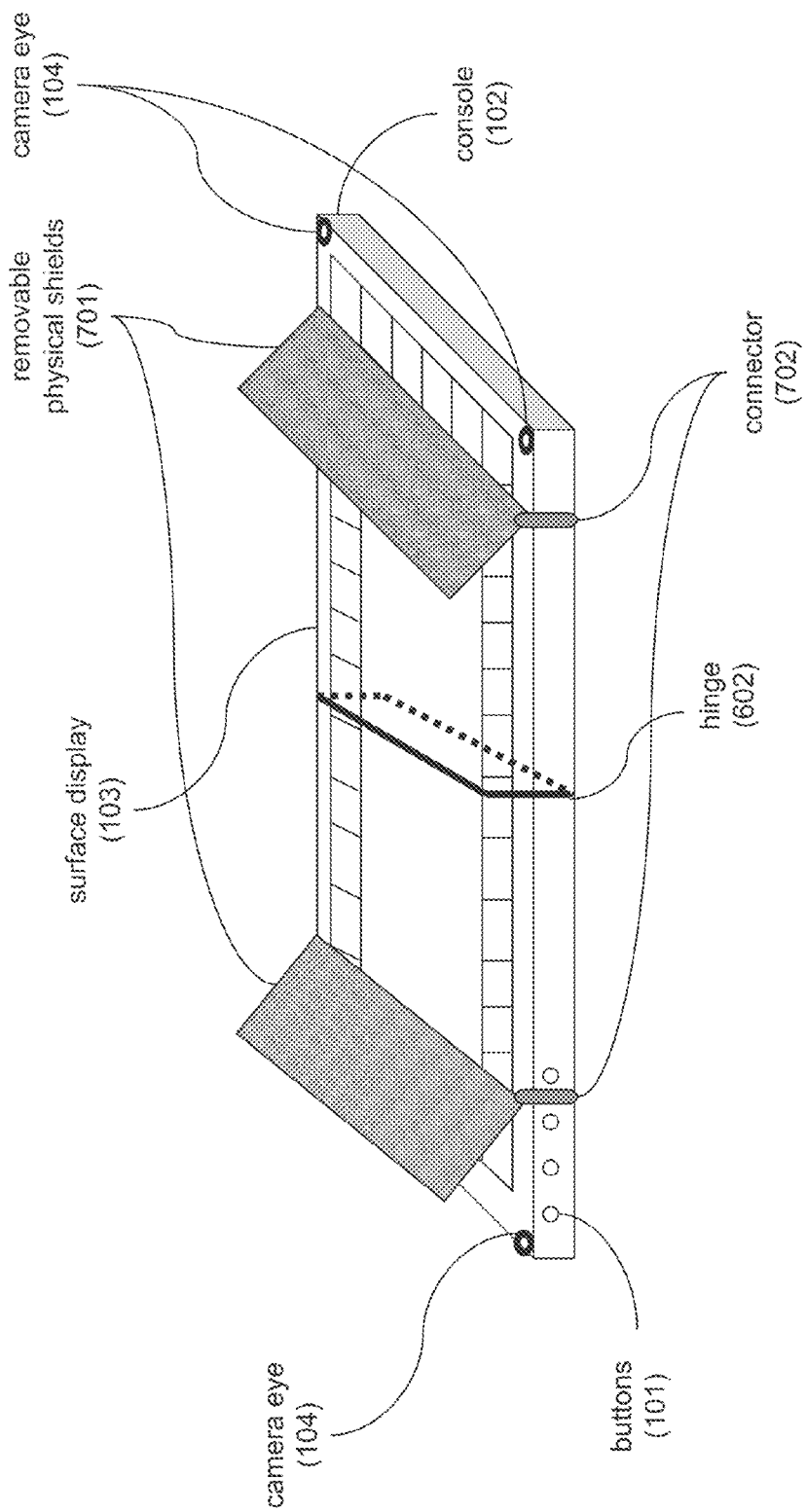
FIG. 7 illustrates a schematic where on or more attachable and movable physical shields can be attached to the console to disrupt the view of opposing players.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

An embodiment of the invention provides for a game board system and method for playing a board game comprising producing on a display surface a first image (201), wherein the first image is a game board image, which visually conveys the field of play for a game, and sensing at least one object on the display surface (202), wherein the object is in contact with the display surface and the display surface shows at least one game piece image (203) at a first position overlaid on the game board image, and wherein the object is sensed on the display surface, and then moving the game piece image from the first position on game board image to a second position on game board image by contacting object at the first position and subsequently at the second position (204).

In another embodiment of the invention, the display surface further comprises a touch-sensitive screen adapted to accept player input for multiple player identities, the touch-sensitive screen may accept the input from multiple players as the method provides for the ability to program and recognize which player is associated with a turn and with a game piece image. "Player identities" are defined as an individual player's profile for the particular game being played and may include avatar, selected game piece, past scores, and other information relevant to the game being played.

In another embodiment, the game board system and method further comprises: forming of game-specific shapes, symbols or letters indicating the position and progress of each game player. Such game-specific shapes, symbols or letters may include, but are not limited to, letters for playing games such as SCRABBLE® by way of example, not limitation. The system and method for playing a board game may comprise displaying counter pieces for each player. "Counter pieces" mean images of dice, cards, spinners or other objects that would advance play in a board game. Such counter pieces may also include a bank or player cash as required for playing games such as MONOPOLY®, by way of example, not limitation. A virtual "dice" or "spinner" can be used in connection with the method of the present invention where a player can touch the surface display. By touching the surface display, the "spinner" can "turn" or the "dice" can "roll," or e.g. card deck will "shuffle," by way of example, not limitation. These virtual game pieces can "slow" down upon removal of the player's finger from the surface or "slow" down based on a predetermined software algorithm. An image of the piece as it generates a player's next turn will be displayed. The "spinner" or "dice" can stop based on a predetermined program or upon release of contact with the board. It is yet another embodiment when the dice or counter can be electronically enabled physical dice with blue tooth or other communication means to roll dice, whereby the roll or turn is communicated to the board.

In yet another embodiment, the board game system and method comprises shielding from view at least a portion of the game board image by other players during play. Certain games require that one player is unable to view the other players' portion of the game board. This can be accomplished by physically attaching a removable shielding apparatus (701), via connectors (702), directly to the board game surface or a console in which the game board surface is set.

In another embodiment, the system and method for board games comprises a physical barrier connected to the surface display (701), (702). In another embodiment, the board game comprises a shielding with optical filtering or a software algorithm that obscures the appropriate portion(s) of the game board image. The optical filtering can be based on modifying electrical images showing viewer perspective, also referred to as "optical louvre." The optical filtering may be incorporated into the display device using various optical devices or may comprise a removable optical filter. The filtering can be accomplished by electronically activated optical film, an optical device that allows software in conjunction with game play to control what on the board one player can see and the other cannot.

In yet another embodiment, an electronic optical louvre (301) which results in angle dependant shading of at least a portion of the display surface. The optical louvre element can be an active filter element, which can be a liquid crystal element or other active optical elements as are known in the art. The optical display can further comprise polarization or other passive filters as are known in the art. The optical louvres can each be separate optical filtering components or comprise a plurality of separate optical filtering components that can each be separately controlled by the system. Thus, a portion of the board may be obscured (e.g. disrupted) from view depending upon the player's viewing angle (303), (304), while another player's view remains unobstructed (e.g. undisrupted) (302), (305). Therefore, the optical louvers can physiologically disrupt the view of the game board surface from some but not all viewing angles.

In yet another embodiment of the invention optical louvre can include such means for obscuring all or portions of the game board surface through the use of detecting means, such as a camera or other device that can capture eye movement, such web-cams are made by Logitech® of California, which can be embedded into the game board apparatus itself, detect where a users eyes are focused to obscure the game board display based on where the user is looking or where the game pieces are positioned. The system may provide for a gaze-tracking device, such as a camera (104), configured to determine the gaze-point of a player, the gaze-tracking device in electronic communication with a the game to correspond to where the player is viewing. The camera (104) can be embedded or built into the game board apparatus and extended when in use, e.g. "pops-out" or "flips-up."

It is yet another embodiment where the optical louvre can obscure portions of the screen corresponding to game pieces or other game board display elements, as in the game STRATEGO® or SCRABBLE®, for example. The selected regions of the game board display are displayed in a substantially unintelligible format using specific software algorithms that appropriately obscure portions of the game board from all players or from some players but not others. Such methods are disclosed in US Publication No. 2009-0141895 A1, herein incorporated by reference in its entirety. Such for systems to obscure display technologies are commercially available from companies such as Oculis Labs of Maryland, USA.

Another embodiment of the invention is drawn to a game board system and method comprising a game board surface adapted to display a game board image which is a touch-sensitive game board surface (103) adapted to receive user input from a pointing device in contact with game board surface. The touch sensitive game board surface senses movement of a pointing device from a first position to a second position and a software driver translates the movement as moving a game piece image across the game board. A software driver translates user input into movement of a game piece image from a first position to a second position. The game piece image can be moved from a first position on game board image to a second position on game board image by manually "dragging" the object by touching, or untouching, a pointing device, i.e. finger, to the first position and subsequently moving the finger across the surface to a second position. The game board surface may be positioned horizontally or vertically for game play.

In another embodiment, the touch sensitive game board surface is adapted to receive input from multiple player identities, and the game system comprises no physical game pieces. In another embodiment, the system comprises a non-physical game piece. The pieces of the present invention are images representing game pieces on the surface game board. The game pieces can be traditional to the game being played or can be downloaded as custom game pieces, or even avatars, i.e. the game players representation of him or herself as a three dimensional model or two-dimensional model. The touch sensitive display surface can be selected from the group consisting of touch sensitive resistive devices, surface wave devices or capacitive devices as are known to those of skill in the art. Such touch sensitive surfaces are readily known in the art and commercially available from, e.g., Koninklijke Philips Electronics, N.V., Eindhoven, Netherlands.

It is a preferred embodiment of the invention to have no physical game pieces. The game pieces are digital pieces that can be manipulated and moved by a player touching the surface and "dragging" his finger across the game board image or alternatively touching the screen in a first location then touching the screen in a second location or alternatively touching the screen in certain patterns or predetermined locations.

It is yet another embodiment of the invention to provide for a holographic or heliographic image of the game pieces projected above the surface of the game board using three dimensional imaging techniques, i.e. holography, spectral imaging. Such holographic projection devices can be incorporated directly into the surface display or into a console or platform to which the surface display is attached. A game piece can be presented as a three-dimensional image onto the game board surface.

In yet another embodiment, the game pieces can be holographic or heliographic images alone or in combination with the image on the game board. Commercially available stereo 3D technologies based on barriers, lenticulars, volumetric scanning from SeeReal Technologies of Germany. The player would have a visual perception of a three dimensional game pieces.

In certain embodiments of the game board, the geometric shape of the game can be modified to accommodate multiple players or games having unusual game board shapes including but not limited to Chinese Checkers. Games with traditional rectangular or square game boards can be electronically modified such that each player can have a side of the board. The game board can accommodate 3, 4, 5, 6, 7, 8 or more players. The method and system for a board game can comprise a rotatable game board image, which rotates according to the player having a turn. Because reading text up-side down can be challenging, upon each player's turn the image displayed in the present embodiment of the game board can rotate such that each player can view the board from a proper perspective and no player must view the board "upside" down. This particularly valuable when playing games that use numbered or lettered pieces or requiring a card to be read upon each turn (e.g. SCRABBLE®, MONOPOLY®, etc.)

The method for playing a board game further comprises user input which is selected from the group consisting of: selecting a game, identifying the game piece image for game play, taking a turn of play, and recognizing a player position relative to the display surface.

It is a further embodiment of the invention to provide for a game board surface that can be played on a game board system that can be played on a table top or vertically as a video display. The system can provide for vertical game play using a remote pointing device and a receiving device which identified player moves. Such remote game play systems on vertical video displays are commercially available as the Wii® system by Nintendo of Japan, for example. The display may be touch screen, the video display of game pieces may be 3D and other features as described herein are included.

The electronic board game further comprises the display surface having an internal adaptable central processing unit. The game board is adapted to download specific additions/upgrades ancillary products, alternate rules, limited edition games or game pieces, etc. The game board can be wi-fi, blue-tooth, cellular, or internet enabled for downloading games or communicating with players remotely. These features may be incorporated into the surface display device or console to which the display device is attached. In another embodiment, the central processing unit is adapted to download a board game from a plurality of sources. The surface display can have an exterior universal serial bus (USB) port, a memory (e.g., a flash memory device, a hard drive,or any memory device known in the art) and can comprise software encoding at least one board game but preferably multiple. In another embodiment, the method comprises loading a board game software product directly to the surface display.

The invention can provide for artificial intelligence capabilities where the game board is adapted to play against other players or can "step-in" for a player temporarily while a player takes a break or leaves. The method and system is further adapted to save a game for resumption of play at a later day or time by all or some players. This feature is beneficial for games which may take an extended period of time to complete the game.

The invention may also be used for traditional game play with tokens and/or game pieces wherein all or a portion of the functionality of the game board is suspended. This embodiment has the advantage of allowing players the flexibility to use the game board in a more traditional fashion.

The invention may further comprise a physical barrier attachable to the game board display. In another embodiment, the display surface is attached to a console, i.e. housing (102), or platform (103). The console of the invention may further comprise a connector (702) for connecting a shielding apparatus (701) to the game board and compartments for storage of pieces or game cartridges. The console may further comprise a hinge for folding. It is also a feature of the invention that the surface display alone may be collapsible, foldable or flexible for ease of storage. The console may also comprise physical controlling features, such as buttons or dials for controlling the game. The display surface may also be collapsible via a hinge device or other such devices as are known and available to those of skill in the art, or roll up for ease of storage.

The foregoing description of the specific embodiments can so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art can recognize that the embodiments of the invention can be practiced with modification within the spirit and scope of the appended claims.

The invention claimed is:

1. A method for playing a board game comprising:
    producing on a display surface a first image, wherein the first image is a game board image, and wherein the entire display surface is divided into a plurality of selectable regions;
    sensing at least one object on the display surface, wherein the object is in contact with the display surface;
    showing on the display surface at least one game piece image at a first position overlaid on the game board image, wherein the game piece image is created by sensing the object on the display surface;
    moving the game piece image from the first position on the game board image to a second position on the game board image by contacting the object at the first position and subsequently at the second position; and selectively rendering selected ones of said selectable regions unintelligible using optical louvers comprising one or more active filter elements.

2. The method according to claim 1, wherein the display surface further comprises a touch-sensitive screen adapted to accept player input for multiple player identities.

3. The method according to claim 1, further comprising forming game-specific shapes, symbols or letters indicating the position and progress of each game player.

4. The method according to claim 1, further comprising displaying counter pieces for each player.

5. The method according to claim 1, wherein said active filter elements block from view at least a portion of the game board image by other players during play, by modifying electrical images, showing players perspectives, displayed via said active filter elements.

6. The method according to claim 5, further comprising a physical barrier connected to the display surface, said physical barrier shielding from view at least a portion of the game board image by other players during play.

7. The method according to claim 1, wherein said game pieces comprise non-physical game pieces.

8. The method according to claim 7, wherein said game pieces are holographic.

9. The method according to claim 1, further comprising rotating a perspective of the game board image according to a player having a turn.

10. The method according to claim 1, wherein the display surface comprises an internal adaptable central processing unit.

11. The method according to claim 1, further comprising enabling user input selected from the group consisting of: selecting a game, identifying the game piece image for game play, taking a turn of play, and recognizing a player position relative to the display surface.

12. The method according to claim 1, wherein the display surface includes a memory device configured with software encoding at least one board game.

13. The method according to claim 1, further comprising loading a board game software product directly to the display surface.

14. The method according to claim 1, further comprising loading additions to games selected from alternative rules, ancillary products, limited edition games or game pieces.

15. The method according to claim 1, further comprising downloading games via wi-fi, Bluetooth, cellular, or internet connectivity.

16. The method according to claim 1, further providing for artificial intelligence.

17. The system according to claim 1, wherein the display surface comprises an embedded camera, and wherein said camera is configured as a gaze-tracking device so as to detect where a user's eyes are focused, and wherein selected ones of said selectable regions are rendered unintelligible based on where the user's eyes are detected as being focused.

18. A board game apparatus, comprising:
    a display surface adapted to display a game board image;
    a touch sensitive game board surface adapted to receive user input from a pointing device in contact with the touch sensitive game board surface, wherein the touch sensitive game board surface senses user input comprising movement of a pointing device from a first position to a second position;
    a software driver wherein the software driver translates the sensed user input into movement of a game piece image from a first position to a second position;
    the game piece image being moved from the first position on the game board image to a second position on the game board image by contacting the object at the first position and subsequently at the second position,
    wherein the touch sensitive game board surface is adapted to receive input from multiple players, wherein the game system comprises no physical game pieces, and wherein the entire display surface is divided into a plurality of selectable regions, and selected ones of said selectable regions are selectively rendered unintelligible using optical louvers comprising one or more active filter elements.

19. The apparatus according to claim 18, wherein the pointing device is selected from the group consisting of resistive devices, surface wave devices or capacitive devices.

20. The apparatus according to claim 18 further comprising a non-physical game piece.

21. The apparatus according to claim 18, wherein a perspective of the game board image rotates according to one of the players having a turn.

22. The apparatus according to claim 18, wherein the display surface comprises a central processing unit adapted to accept user input.

23. The apparatus according to claim 22, wherein the central processing unit is adapted to download a board game from a plurality of sources.

24. The apparatus according to claim 18 further comprising a shielding device to block from view at least a portion of the game board image.

25. The apparatus according to claim 24, wherein the shielding device comprises a physical barrier detachable from the display surface.

26. The apparatus according to claim 24, wherein the shielding device comprises optical louvers for optically filtering the game board image.

27. The apparatus according to claim 18, wherein the display surface displays counter pieces for each player.

28. The apparatus according to claim 18, wherein the display surface is attached to a console.

29. The apparatus according to claim 28, wherein the console comprises a means for connecting physical shielding devices.

30. The apparatus according to claim 28, wherein the console comprises a storage compartment.

31. The apparatus according to claim 28, wherein the console is collapsible, foldable, or flexible for storage.

32. The apparatus according to claim 18, wherein the display surface comprises an embedded camera, and wherein said camera is configured as a gaze-tracking device so as to detect where a player's eyes are focused, and wherein selected ones of said selectable regions are rendered unintelligible based on where the player's eyes are detected as being focused.

33. The apparatus according to claim 32, wherein the display surface is attached to a console and wherein the console bears an exterior universal serial bus (USB).

34. A board game apparatus, comprising:
a display surface adapted to display a game board image, the display surface being divided into a plurality of selectable regions associated with a plurality of optical louvers;
a camera embedded in the display surface, wherein said camera is configured as a gaze-tracking device so as to detect where a player's eyes are focused, wherein selected ones of said selectable regions are rendered unintelligible using the optical louvers based on where the player's eyes are detected as being focused;
a touch sensitive game board surface adapted to receive user input from a pointing device in contact with the touch sensitive game board surface, wherein the touch sensitive game board surface senses user input comprising movement of a pointing device from a first position to a second position;
a software driver wherein the software driver translates the sensed user input into movement of a game piece image from a first position to a second position;
the game piece image being moved from the first position on the game board image to a second position on the game board image via user input by contacting the object at the first position and subsequently at the second position,
wherein the touch sensitive game board surface is adapted to receive input from multiple players, and wherein the game system comprises no physical game pieces.

* * * * *